US008775043B2

(12) United States Patent
Imaseki et al.

(10) Patent No.: US 8,775,043 B2
(45) Date of Patent: Jul. 8, 2014

(54) CONTROL METHOD OF HYBRID VEHICLE

(75) Inventors: Takashi Imaseki, Yokohama (JP);
Takashi Miyano, Yokohama (JP); Nils Schoeche, Yokohama (JP)

(73) Assignee: Bosch Corporation, Tokyo (JP)

( * ) Notice: Subject to any disclaimer, the term of this patent is extended or adjusted under 35 U.S.C. 154(b) by 628 days.

(21) Appl. No.: 12/521,699

(22) PCT Filed: Nov. 5, 2007

(86) PCT No.: PCT/JP2007/071490
§ 371 (c)(1),
(2), (4) Date: Jun. 29, 2009

(87) PCT Pub. No.: WO2008/078459
PCT Pub. Date: Jul. 3, 2008

(65) Prior Publication Data
US 2010/0324762 A1    Dec. 23, 2010

(30) Foreign Application Priority Data
Dec. 27, 2006 (JP) ................................. 2006-351289

(51) Int. Cl.
*G06F 17/00* (2006.01)

(52) U.S. Cl.
USPC .................................. 701/67; 701/22; 477/5

(58) Field of Classification Search
USPC ............... 701/22, 51, 67–70; 192/3.51–3.52, 192/3.54; 477/1–8, 14–16; 180/65.1, 65.21, 180/65.6–65.7
See application file for complete search history.

(56) References Cited

U.S. PATENT DOCUMENTS

| 5,168,975 A | 12/1992 | Bernhardt et al. |
| 5,495,912 A * | 3/1996 | Gray et al. ................... 180/165 |

(Continued)

FOREIGN PATENT DOCUMENTS

| JP | 2001200920 A | 7/2001 |
| JP | 200289688 A | 3/2002 |

(Continued)

OTHER PUBLICATIONS

Translation of Japanese Office Action dated Aug. 22, 2011.

(Continued)

*Primary Examiner* — John Q Nguyen
*Assistant Examiner* — Michael Ng
(74) *Attorney, Agent, or Firm* — Michael Best & Friedrich LLP

(57) ABSTRACT

A hybrid vehicle includes an internal-combustion engine, an engine starter ISG motor, a main motor that drives rear wheels, a CVT pulley belt disposed between an engine output shaft and a front wheel shaft, a clutch connected between the output shaft of the internal-combustion engine and an input shaft of the CVT, a battery, and a hybrid controller. When the hybrid controller determines that there is a need to add a traction force of the engine from a state where the vehicle is driven by the main motor alone, the hybrid controller controls the respective components so as to start the engine by the ISG motor in a state where the clutch is disengaged, control a speed ratio of the CVT so that a CVT input speed achieves a target speed for starting clutch engagement, detects the engine rotation speed, detects the CVT input speed, and engages the clutch when a difference between those speeds falls within a predetermined range.

11 Claims, 8 Drawing Sheets

(56) References Cited

U.S. PATENT DOCUMENTS

| | | | |
|---|---|---|---|
| 6,083,138 A * | 7/2000 | Aoyama et al. | 477/5 |
| 6,083,139 A * | 7/2000 | Deguchi et al. | 477/5 |
| 6,291,902 B1 | 9/2001 | Ogane et al. | |
| 6,377,883 B1 * | 4/2002 | Shimabukuro et al. | 701/51 |
| 6,600,980 B1 * | 7/2003 | Kraska et al. | 701/22 |
| 6,715,572 B2 * | 4/2004 | Shimabukuro et al. | 180/65.6 |
| 6,722,332 B2 * | 4/2004 | Kojima | 123/179.3 |
| 6,761,659 B2 | 7/2004 | Eguchi et al. | |
| 7,004,884 B2 * | 2/2006 | Cho | 477/3 |
| 7,520,351 B2 * | 4/2009 | Uchisasai et al. | 180/65.245 |
| 2001/0016165 A1 * | 8/2001 | Shimabukuro et al. | 417/2 |
| 2004/0040810 A1 * | 3/2004 | Notsu et al. | 192/3.54 |
| 2004/0124021 A1 | 7/2004 | Shirai et al. | |
| 2008/0083579 A1 * | 4/2008 | Okuda et al. | 180/293 |
| 2009/0200095 A1 * | 8/2009 | Kawasaki | 180/65.265 |
| 2009/0250278 A1 * | 10/2009 | Kawasaki et al. | 180/65.275 |
| 2010/0273604 A1 * | 10/2010 | Imaseki | 477/5 |
| 2010/0312422 A1 * | 12/2010 | Imaseki | 701/22 |

FOREIGN PATENT DOCUMENTS

| | | | |
|---|---|---|---|
| JP | 2003252082 A | * | 9/2003 |
| JP | 2004175320 A | | 6/2004 |
| JP | 200553402 A | | 3/2005 |
| JP | 2005297727 A | | 10/2005 |
| JP | 200654936 A | | 2/2006 |
| JP | 2006335196 A | | 12/2006 |

OTHER PUBLICATIONS

Translation of Japanese Decision of Rejection dated Jan. 13, 2012.
English Summary of Japanese Laid-Open Patent Application No. 2006-54936.
English Summary of Japanese Laid-Open Patent Application No. 2005-297727.

* cited by examiner

CONTROL METHOD OF HYBRID VEHICLE

TECHNICAL FIELD

The present invention relates to a control method of a hybrid vehicle.

BACKGROUND ART

For a hybrid vehicle, techniques of controlling engagement and disengagement of a clutch provided between the engine and the motor are described in the following references.

JP-A-2006-160104 discloses a control device in a hybrid four-wheel-drive vehicle including a clutch provided between the engine and the motor, front wheels driven by a traction force supplied from the engine and the motor, and rear wheels to which a traction force is supplied from another motor. The control device is configured to calculate a maximum traction force of the rear wheels on the basis of a predicted road friction coefficient and then to calculate a traction force of the front wheels from the demanded traction force and the maximum traction force of the rear wheels, so that it determines to engage the clutch in a case where the motor is not able to achieve the traction force of the front wheels. Also, the control device is configured to control the engine, the clutch, and the rear wheel motor by distributing the demanded traction force to the clutch according to the engagement determination when distributing the demanded traction force.

However, when the vehicle is driven while the clutch is disengaged, there is a difference of rotational frequencies between the clutch input and output shafts. When the clutch is engaged under these circumstances, the clutch is forced to slip, which raises a problem that the clutch durability is deteriorated and a shock reaches the vehicle.

JP-A-2003-237383 discloses a configuration provided with a clutch that is engaged and disengaged between the motor and the transmission for power transmission, and, as means for controlling the clutch engagement and disengagement, means for controlling the rotational frequency of the motor by defining the rotational frequency on the clutch transmission side as the target rotational frequency when switching the clutch to an engaged state and means for waiting until a difference of the rotational frequencies between the target rotational frequency and the rotational frequency of the clutch transmission side falls within a predetermined allowable range to switch the clutch to the engaged state.

However, in a case where the engine is also connected to the motor side, there is a problem that it takes a time to increase or decrease the rotational frequency due to inertia and energy is consumed unnecessarily.

JP-A-2000-255279 discloses a configuration adopted in a hybrid vehicle provided with a clutch that transmits engine rotations to a traction system equipped with a motor and a CVT that can change steplessly a reduction ratio of the traction system after the motor. According to this configuration, when the clutch is to be engaged in a drive state where the temperature of the clutch exceeds a preset temperature, a speed ratio of the CVT is regulated so that the rotational frequency on the clutch output side becomes equal to or lower than the preset rotational frequency and the engine and the traction system are engaged at or lower than the preset rotational frequency. A power source can be consequently switched from the motor to the engine by performing engagement operation rapidly at a high temperature without having to perform a slip operation that accelerates wear of the clutch.

The CVT speed ratio is made variable in order to prevent deterioration of the clutch durability. However, while the clutch is disengaged, the motor rotational frequency of the motor that is driving the vehicle varies with a change of the CVT speed ratio. This raises a problem that the driver has to drive the vehicle in a poor motor efficiency region and a problem that torque driving the vehicle shifts from the value demanded by the driver.

JP-A-2004-308913 describes the control of engagement and disengagement of the clutch in a case where a drive state using the motor alone shifts to hybrid drive. For example, in a case where the driver of a strong hybrid vehicle that can be driven by a traction motor alone up to a certain point wishes to rapidly accelerate the speed from a state where the vehicle is driven by a light load motor alone, the engine has to be started first in order to obtain the maximum output and the clutch is engaged after the engine start, and then the drive state is shifted to the hybrid drive.

In a case where there is a large difference between the engine rotational frequency and the rotational frequency of the CVT input shaft at the time of clutch engagement, a significant shock is induced, which raises a need to interpose a torque converter or the like for absorbing a shock. In addition, in a case where it is waited until the rotational frequencies coincide with each other to engage the clutch, a waiting time is extended. The driver therefore cannot obtain acceleration as he wishes, which raises a problem of a delayed response.

Patent Document 1: JP-A-2006-160104
Patent Document 2: JP-A-2003-237383
Patent Document 3: JP-A-2000-255279
Patent Document 4: JP-A-2004-308913

DISCLOSURE OF THE INVENTION

Problems to be Solved by the Invention

The invention was devised in view of the facts described above, and has an object not only to reduce influences to the life of the clutch by reducing slip of the clutch but also to reduce a shock at the clutch engagement during the clutch engagement control between the engine and the motor when the hybrid vehicle shifts from motor drive to hybrid drive. Another object of the invention is to minimize an initial acceleration delay when the hybrid vehicle shifts from the motor drive to the hybrid drive.

Means for Solving the Problems

The invention was devised in view of the foregoing facts and a control method of a hybrid vehicle according to a first aspect of the invention is configured in such a manner that the hybrid vehicle includes an internal-combustion engine, a traction motor that electrically drives the hybrid vehicle, a continuous variable transmission provided between an output shaft of the internal-combustion engine and an axle of first drive wheels, and a clutch provided between the output shaft of the internal-combustion engine and an input shaft of the continuous variable transmission, and that following steps are performed; determining whether there is a need to add a traction force of the internal-combustion engine from a state where the vehicle is driven by the traction motor alone; starting the internal-combustion engine in a state where the clutch is disengaged when it is determined that there is a need to add the traction force of the internal-combustion engine and controlling a speed ratio of the continuous variable transmission so that a rotation speed of the input shaft of the continuous variable transmission achieves a target speed for starting clutch engagement; detecting a rotation speed of the output shaft of the internal-combustion engine; detecting the rotation speed of the input shaft of the continuous variable transmission; and engaging the clutch when a difference between the detected rotation speed of the output shaft of the internal-combustion engine and the detected rotation speed of the input shaft of the continuous variable transmission falls within a predetermined range.

According to the first aspect of the invention, the vehicle is driven by the traction motor alone at the beginning. In this state, whether there is a need to add a traction force of the internal-combustion engine is determined. In this determining step, it is preferable to determine that there is a need to add a traction force of the internal-combustion engine when demanded torque from the driver exceeds torque achievable by the traction motor. When it is determined that there is a need to add a traction force of the internal-combustion engine, the internal-combustion engine is started in a state where the clutch is disengaged. It is preferable that the engine is started by rotations of a starter motor. Further, the speed ratio of the continuous variable transmission is controlled so that the rotation speed of the input shaft of the continuous variable transmission reaches the target speed for starting clutch engagement. It is preferable that the target speed for starting clutch engagement is set to an idling speed of the internal-combustion engine. During this period, the rotation speed of the output shaft of the internal-combustion engine is detected and the rotation speed of the input shaft of the continuous variable transmission is detected. The clutch is engaged when a difference between the detected rotation speed of the output shaft of the internal-combustion engine and the rotation speed of the input shaft of the continuous variable transmission falls within a predetermined range. Hence, according to the first aspect of the invention, not only is it possible to reduce influences to the life of the clutch by reducing slip of the clutch, but it is also possible to reduce a shock at the clutch engagement during the clutch engagement control between the engine and the motor when the hybrid vehicle shifts from the motor drive to the hybrid drive.

A preferable example of a hybrid vehicle to which the control method of the hybrid vehicle of the invention is applicable is configured in such a manner that the traction motor is coupled to an axle of second drive wheels that is different from the axle of the first drive wheels. More preferably, the hybrid vehicle is a four-wheel drive vehicle having the first drive wheels and the second drive wheels.

According to the first aspect as the preferable example of the invention described above, in a case where the hybrid vehicle is driven by the electric drive by which the second drive wheels are driven by the traction motor, the first drive wheels are in a state of free running in association with the driving of the vehicle. In this instance, by controlling the speed ratio of the continuous variable transmission, it becomes possible to adjust the speed of the input shaft of the continuous variable transmission to reach the target speed for starting clutch engagement as described above.

It is preferable to further include controlling the speed ratio of the continuous variable transmissions, so that the rotation speed of the input shaft of the continuous variable transmission reaches the target speed for starting clutch engagement even in a case where it is determined that there is no need to add the traction force of the internal-combustion engine in the determining step in case of an increase of the demanded torque.

A control method of a hybrid vehicle according to a second aspect of the invention is configured in such a manner that the hybrid vehicle includes an internal-combustion engine, a traction motor that electrically drives the hybrid vehicle, a continuous variable transmission provided between an output shaft of the internal-combustion engine and an axle of first drive wheels, a clutch provided between the output shaft of the internal-combustion engine and an input shaft of the continuous variable transmission, and a starter motor connected coaxially to the output shaft of the internal-combustion engine, and that following steps are performed: determining whether there is a need to add a traction force of the internal-combustion engine from a state where the vehicle is driven by the traction motor alone; starting the internal-combustion engine using the starter motor in a state where the clutch is disengaged when it is determined that there is a need to add the traction force of the internal-combustion engine and controlling a speed ratio of the continuous variable transmission so that a rotation speed of the input shaft of the continuous variable transmission achieves a target speed for starting clutch engagement; detecting a rotation speed of the output shaft of the internal-combustion engine; detecting the rotation speed of the input shaft of the continuous variable transmission; and operating the clutch to be engaged when the detected rotation speed of the output shaft of the internal-combustion engine becomes as high as or higher than the detected rotation speed of the input shaft of the continuous variable transmission.

It is preferable to further include adding a load of the starter motor to the internal-combustion engine when the rotation speed of the output shaft of the internal-combustion engine becomes as high as or higher than the rotation speed of the input shaft of the continuous variable transmission. It is further preferable that the load of the starter motor is adjusted according to a difference between the rotation speed of the output shaft of the internal-combustion engine and the rotation speed of the input shaft of the continuous variable transmission. It is preferable that the load of the starter motor is adjusted by controlling the starter motor to generate zero torque or negative torque.

In the step of starting the internal-combustion engine, an initial acceleration delay can be eliminated by driving the internal-combustion engine at the maximum power. Accordingly, even in a case where a climbing rate of the engine speed is extremely high, because the load of the starter motor is added to the internal-combustion engine as described above, a climb of the engine speed is suppressed, which in turn makes it possible to adjust rapidly the engine speed to the target speed for starting clutch engagement. It is preferable to further include adjusting a control operation of the continuous variable transmission to the target speed for starting clutch engagement when the rotation speed of the output shaft of the internal-combustion engine becomes as high as or higher than the rotation speed of the input shaft of the continuous variable transmission. Because a time when the target speed is achieved can be predicted on the basis of a difference of the rotation speeds and the like at a point in time when the rotation speed of the output shaft of the internal-combustion engine becomes as high as or higher than the rotation speed of the input shaft of the continuous variable transmission, the rotation speed of the input shaft of the continuous variable transmission can be adjusted more rapidly to the target speed for starting clutch engagement by changing and adjusting a speed ratio map of the continuous variable transmission.

Another preferable example of a hybrid vehicle to which the control method of the hybrid vehicle of the invention is applicable is configured in such a manner that it further includes a drive-reverse-neutral switching unit provided on an internal-combustion engine output side of the continuous variable transmission and a gear provided on the axle side of the first drive wheels of the continuous variable transmission.

The clutch is achieved by a clutch provided at least inside the drive-reverse-neutral switching unit, and the traction motor is coupled coaxially to the output shaft of the continuous variable transmission.

Still another preferable example of a hybrid vehicle to which the control method of the hybrid vehicle of the invention is applicable is configured in such a manner that it further includes a gear provided between the output shaft of the continuous variable transmission and the axle of the first drive wheels and equipped with a counter shaft of the output shaft of the continuous variable transmission. The clutch is a damping factor integrated clutch and the traction motor is coupled coaxially to the counter shaft.

EXPLANATION OF REFERENCE NUMERALS

Figure 1:
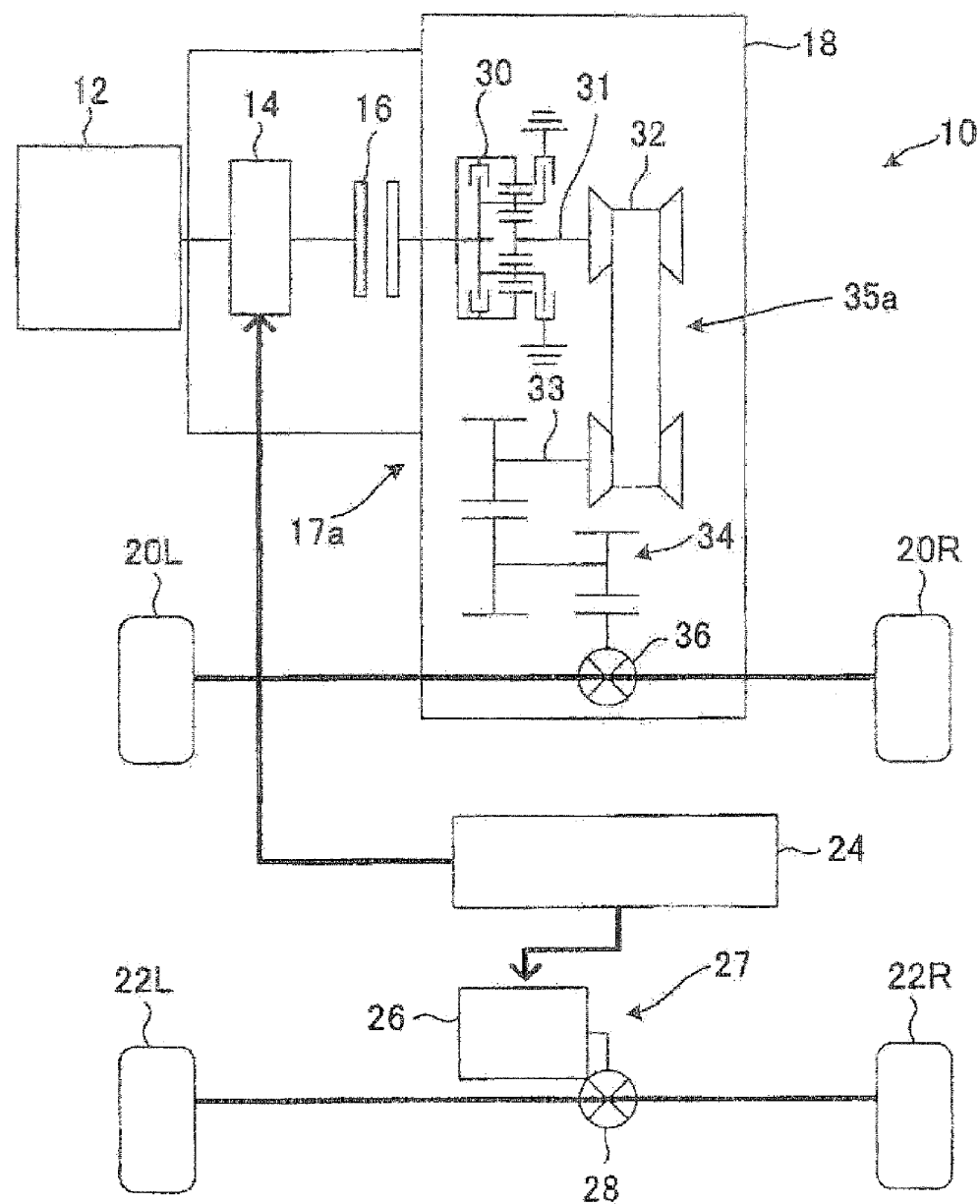
FIG. 1 is a schematic view of a vehicle to which a control method of a hybrid system according to a first embodiment of the invention is applied.

10: hybrid vehicle
12: internal-combustion engine
14: integrated starter generator
16: clutch
17a, 17b, and 17c: first traction system
18: transmission
20L and 20R: front wheels
22L and 22R: rear wheels
24: battery
26: main motor
27: second traction system
28: differential gear
30: drive-reverse-neutral switching unit
31: CVT input shaft
32: continuous variable transmission (CVT) pulley belt
33: CVT output shaft
34: gear
35a, 35b, and 35c: non-stage transmission
36: differential gear
38: engine controller
40: inverter
42: clutch controller
44: CVT controller
46: inverter
48: battery controller
50: hybrid controller
52: traction torque and output demanded values calculator
54: battery SOC determination unit
56: generator of control demand for E-drive
58: generator of control demand for HEV-drive
60: generator of control demand for staring engine
62: generator of control demand for engaging clutch
64: acceleration opening sensor
66: vehicle speed sensor
67: CVT input speed sensor

EMBODIMENTS

Hereinafter, respective embodiments of the invention will be described with reference to the drawings.

First Embodiment

FIG. 1 shows a vehicle 10 to which a control method of a hybrid system according to a first embodiment of the invention is applied. The vehicle 10 is constructed as a hybrid four-wheel-drive vehicle and includes an internal-combustion engine 12, a first traction system 17a that transmits a traction force of the internal-combustion engine to the axle of front wheels 20L and 20R, a battery 24, and a second traction system 27 that supplies electric power to the axle of rear wheels 22L and 22R.

In order to enable both a supply of torque to start the engine 12 and electric power generation by torque from the engine 12, the first traction system 17a includes an integrated starter generator 14 connected to the battery 24, a clutch 16 whose input side is connected to the output shaft of the integrated starter generator, and a transmission 18 connected to the output side of the clutch 16. The transmission 18 is formed of a non-stage transmission 35a configured as means capable of changing steplessly a speed ratio and a differential gear 36. In a preferred example of the first embodiment, the non-stage transmission 35a includes a drive-reverse-neutral switching unit 30 (capable of switching to any one of drive, neutral, and reverse positions) connected to the output side of the clutch 16, a continuous variable transmission (CVT) pulley belt 32 (corresponding to continuous variable transmission in the appended claims), and a gear 34. When the clutch 16 is engaged, a traction force from the engine 12 is transmitted to a CVT input shaft 31 via the drive-reverse-neutral switching unit 30, and transmitted further onto the axle of the front wheels via the CVT pulley belt 32, a CVT output shaft 33, the gear 34, and the differential gear 36.

The second traction system 27 includes a main motor 26 to which electric power is supplied from the battery 24 and a differential gear 28 provided on the axle of the rear wheels. Electromotive power from the main motor 26 is transmitted onto the axle of the rear wheels via the differential gear 28. It should be noted that the main motor 26 is also able to charge the battery 24 by generating electric power during the regenerative sequence.

Figure 2:
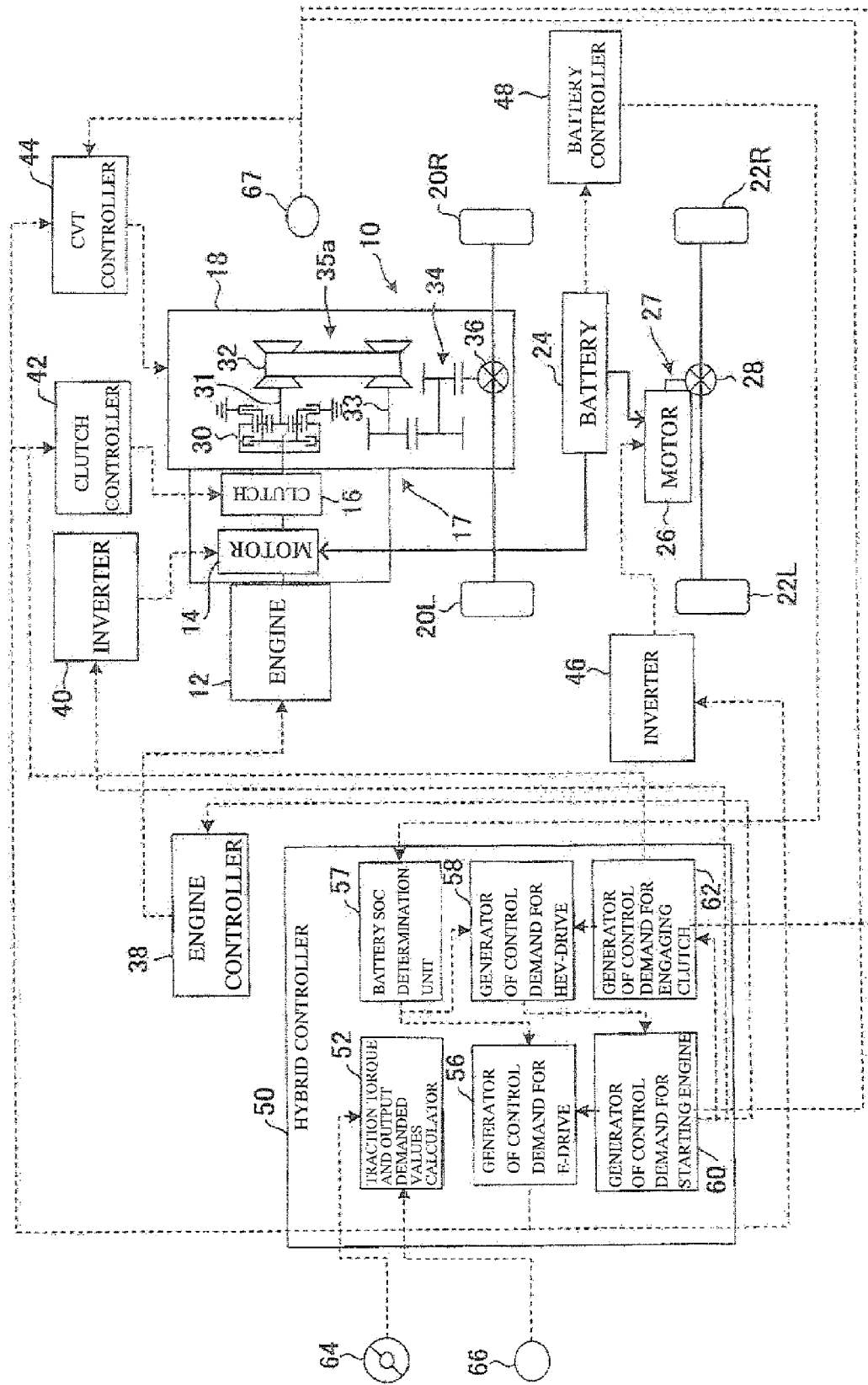
FIG. 2 is a block diagram showing the control method of the hybrid system of the first embodiment incorporated into the vehicle of FIG. 1.

FIG. 2 further shows a control system of the vehicle 10 of FIG. 1 that enables the control method of the hybrid system of the first embodiment. In FIG. 2, like components are labeled with like reference numerals with respect to FIG. 1.

As is shown in FIG. 2, the control system of the vehicle 10 includes an engine controller 38 that performs control necessary to control the engine, an inverter 40 that controls the rotational frequency of the integrated starter generator 14, a clutch controller 42 that controls engagement and disengagement of the clutch 16, a CVT controller 44 that controls a speed ratio of the CVT pulley belt 32, a battery controller 48 that controls charging and discharging of the battery 24, an inverter 46 that controls the rotational frequency of the main motor 26, and a hybrid controller 50 that performs the hybrid control method according to the first embodiment of the invention by managing the foregoing controllers and the inverters and controlling them on demand.

Further, FIG. 2 shows a functional block diagram of the hybrid controller 50. According to this functional block diagram, the hybrid controller 50 includes a traction torque and output demanded values calculator 52 that calculates a traction torque demanded value and an output demanded value that the driver is demanding on the basis of an accelerator opening signal from an accelerator opening sensor 64 and a vehicle speed signal from a vehicle speed sensor 66, a battery SOC determination unit 54 that determines an SOC (State of Charge) of the battery 24 on the basis of a signal from the battery controller 48, a generator 56 of control demand for electric driving (E-drive) not only for controlling the clutch controller 42 and the inverter 46 on demand so that switching is made to E-drive in response to the determined SOC of the battery 24 and the main motor 26 is controlled during the E-drive but also for controlling a speed ratio of the CVT pulley belt 32 according to a signal from a CVT input speed sensor 67, a generator 58 of control demand for hybrid driving (HEV-drive) for demanding HEV-drive by both the motor and the engine in response to the determined SOC of the battery 24, a generator 60 of control demand for starting engine for controlling the engine controller 38 and the inverter 40 on demand so as to control a start of the engine, and a generator 62 of control demand for engaging clutch for demanding the clutch controller 42 to control engagement and disengagement of the clutch according to an engine start demand.

The flow of the process according to the hybrid control method of the first embodiment will now be described using the flowcharts of FIG. 3 and FIG. 4.

Figure 3:
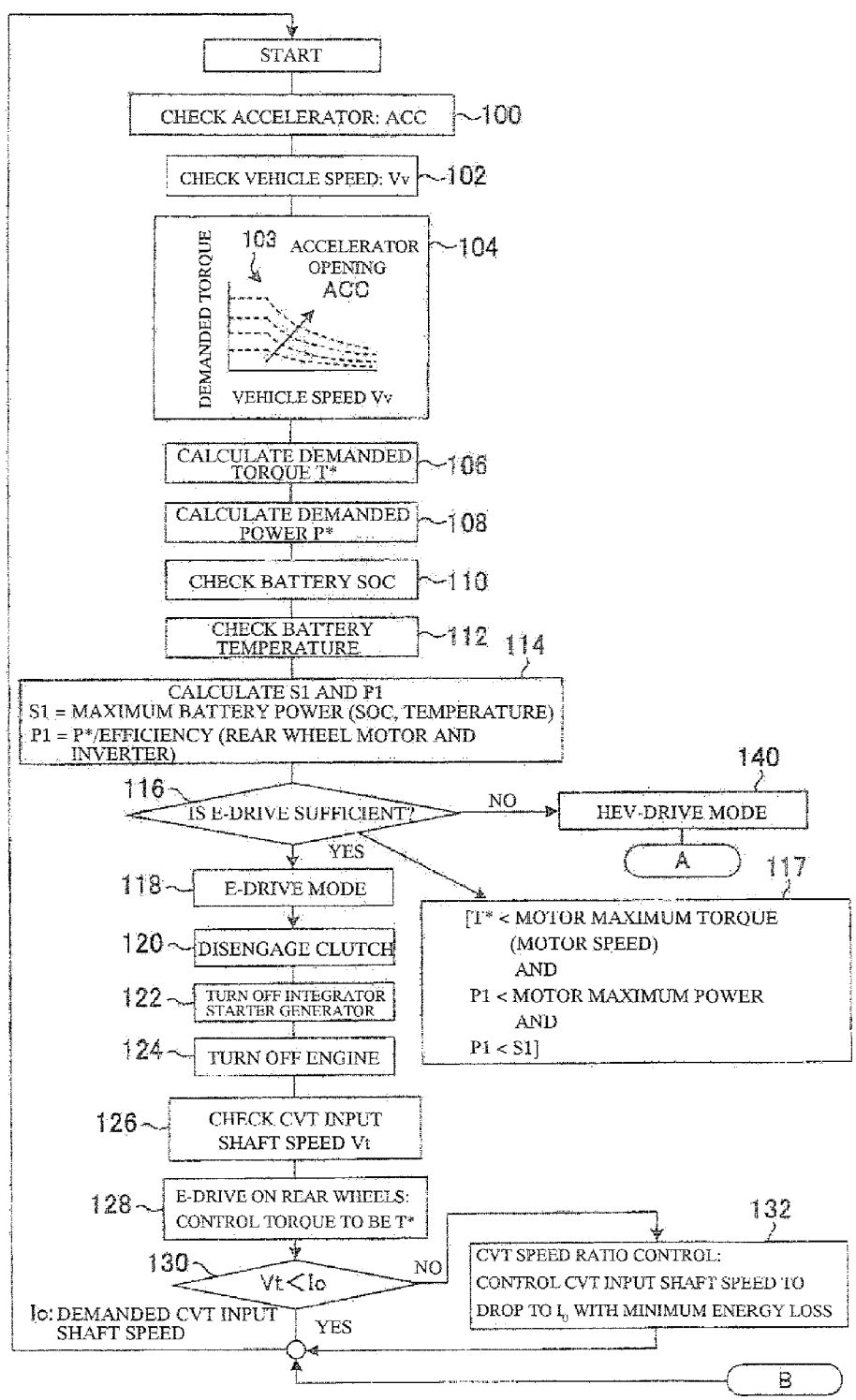
FIG. 3 is a main flowchart showing the flow of the control method of the hybrid system of the first embodiment.

The process of FIG. 3 begins in a state where the vehicle 10 is started to move by driving the main motor 26 first while the engine 12 and the integrated starter generator 14 are at rest and the clutch 16 is disengaged.

As is shown in FIG. 3, the traction torque and output demanded values calculator 52 finds an accelerator opening Acc by checking a signal from the accelerator opening sensor 64 (Step 100) and finds a vehicle speed Vv by checking a vehicle speed signal from the vehicle speed sensor 66 (Step 102). The traction torque and output demanded values calculator 52 pre-stores a look-up table 103 of demanded torque T* as functions of the accelerator opening Acc and the vehicle speed Vv and searches through the look-up table 103 (Step 104) to calculate the demanded torque T* corresponding to the accelerator opening Acc and the vehicle speed Vv found in Steps 100 and 102, respectively (Step 106). Subsequently, the traction torque and output demanded values calculator 52 finds demanded power P* for the battery 24 corresponding to the demanded torque T* by simple calculation (Step 108).

The battery SOC determination unit 54 checks the SOC of the battery 24, that is, a ratio of a charged amount with respect to the maximum charged amount of the battery 24 to find the SOC (Step 110), and checks the temperature of the battery 24 to find the battery temperature (Step 112).

The generator 56 of control demand for E-drive calculates maximum battery power S1 that can be supplied from the battery 24 at this point in time as a function of the SOC found in Step 110 and the battery temperature found in Step 112 and calculates power P1 that the battery 24 should supply at this point in time on the basis of the demanded power P* calculated in Step 108 (Step 114). Power P1 is found by the following equation.

$$P1 = P^*/\text{efficiency } E$$

Herein, the efficiency E indicates a ratio at which the power supplied from the battery 24 can be converted to torque by the main motor 26 and the inverter 46.

Subsequently, the generator 56 of control demand for E-drive determines whether the E-drive by the main motor 26 alone is sufficient to achieve the demanded torque T* on the basis of S1 and P1 found in Step 114 (Step 116). As is described in a block 117 of FIG. 3, when the condition of Equation (1) below is satisfied, it is determined that the E-drive alone is sufficient.

demanded torque $T^*$<maximum torque (motor speed) of motor 26; and $P1$<maximum power that can be supplied to motor 26; and $$P1 < S1 \tag{1}$$

Upon determining that the E-drive alone is sufficient (affirmative determination in Step 116), the generator 56 of control demand for E-drive continues the E-drive mode in which the main motor 26 alone drives the rear wheels (Step 113). In the E-drive mode, the clutch 16 is disengaged (Step 120), the integrated starter generator 14 is turned off (Step 122), and the engine 12 is turned off (Step 124). Also, the generator 56 of control demand for E-drive checks an output signal from the CVT input speed sensor 67 to find a rotation speed Vt of the CVT input shaft 31 (Step 126).

In the E-drive mode, the generator 56 of control demand for E-drive controls the driving of the motor 26 at the torque equal to the demanded torque T* by controlling the inverter 46 (Step 128). In this instance, it is determined whether the rotation speed Vt of the CVT input shaft 31 found in Step 126 is lower than a demanded CVT input shaft speed $I_0$ (for example, engine idling rotational frequency) (Step 130). In a case where the rotation speed Vt is lower than the demanded speed $I_0$ (affirmative determination in Step 130), the flow returns to Step 100 and the control is repeated in the same manner as described above.

On the contrary, in a case where the rotation speed Vt of the CVT input shaft 31 is higher than the demanded speed $I_0$ (negative determination in Step 130), the CVT controller 44 controls a speed ratio of the CVT pulley belt 32 so that the rotation speed Vt of the input shaft 31 drops to the speed $I_0$ in a minimum energy loss state (Step 132). In this instance, in the E-drive mode in which the rear wheels alone are driven, the front wheels 20R and 20L and the transmission 18 are in a state of free running in association with the movement of the vehicle. In this state, the speed ratio of the CVT changes automatically with a speed change pattern in response to the vehicle speed and the accelerator opening as preset for a normal car under the normal control. In a case where the vehicle speed climbs actually, so correspondingly does the rotation speed on the CVT input shaft side. In the invention, however, in such a state, the speed change control of the CVT is performed in such a manner that the rotation speed of the CVT input shaft comes in close proximity to a preset constant value $I_0$. It should be noted that because the front wheel traction system 17 does not generate traction torque during this period, even when the CVT is controlled in a special manner as above, there will be no influences to the driving of the vehicle. When the CVT speed ratio control is performed, the flow returns to Step 100, and the control is repeated in the same manner as described above.

Meanwhile, in a case where it is determined in Step 116 that the E-drive alone is insufficient to achieve the demanded torque T* (negative determination in Step 116), the drive mode shifts to a HEV-drive mode by the generator 58 of control demand for HEV-drive (Step 140).

The flow of the HEV-drive mode will now be described using FIG. 4.

Figure 4:
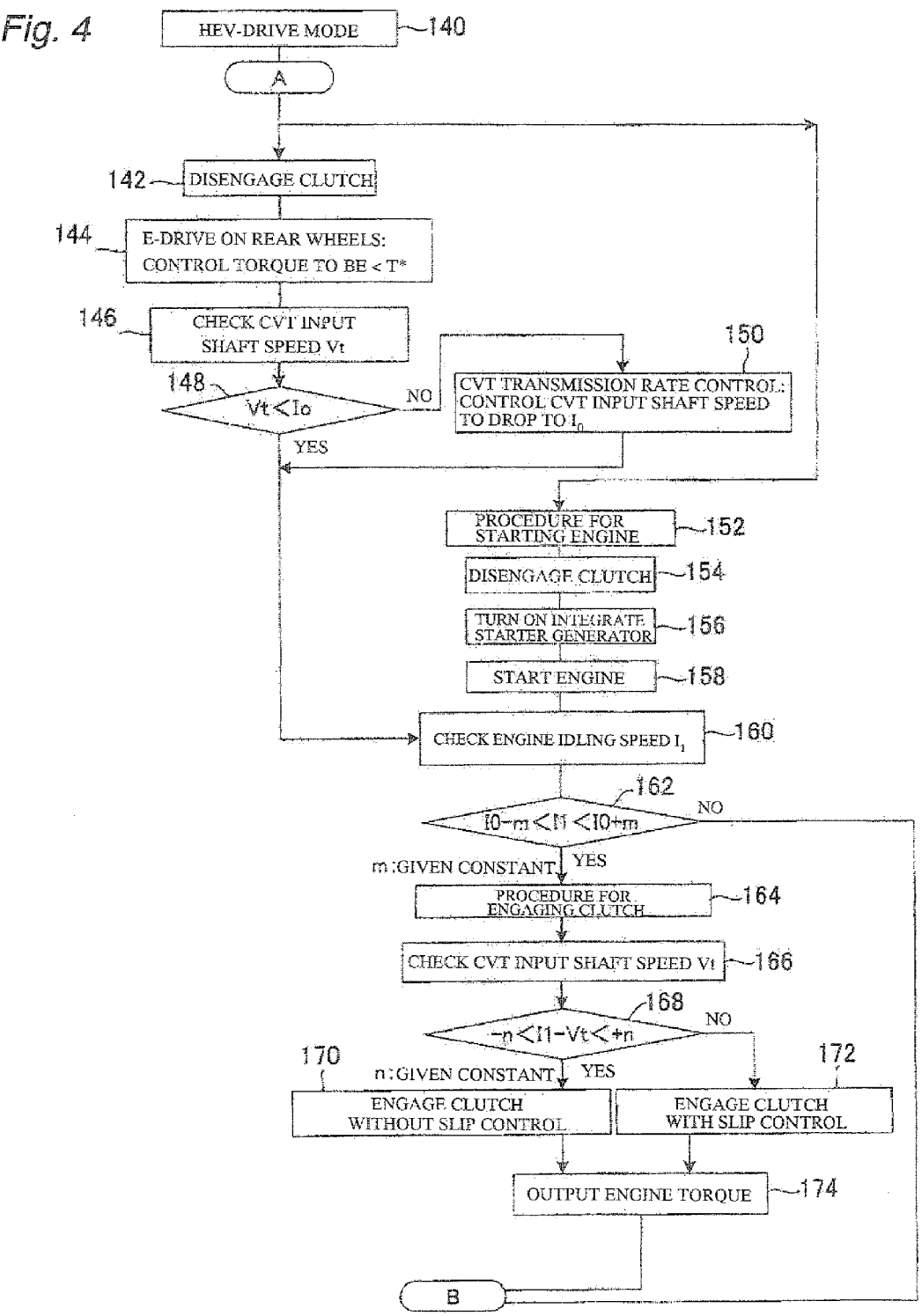
FIG. 4 is a flowchart showing the flow of a hybrid drive mode by the control method of the hybrid system of the first embodiment.

As is shown in FIG. 4, when the drive mode has shifted to the HEV-drive mode (Step 140), the flow proceeds to the procedure for starting engine (Step 152). According to the procedure for starting engine, in a state where the clutch 16 is disengaged (Step 154), the integrated starter generator 16 is turned on for operation under control (Step 156), by which the engine 12 is started (Step 158).

In addition, when the drive mode has shifted to the HEV-drive mode (Step 140) in parallel with the procedure for starting engine as described above, the clutch 16 is maintained in a disengaged state (Step 142) and the E-drive on the rear wheels is continued (Step 144). Naturally, the E-drive is performed in a state where the motor torque to the rear wheels is smaller than the demanded torque T*. In this instance, an output signal from the CVT input speed sensor 67 is checked to find the rotation speed Vt of the CVT input shaft 31 (Step 146). It is then determined whether the rotation speed Vt of the CVT input shaft 31 found in Step 146 is lower than the demanded CVT input shaft speed $I_0$ (for example, the engine idling rotational frequency) (Step 148). In a case where the rotation speed Vt of the CVT input shaft 31 is higher than the demanded speed $I_0$ (negative determination in Step 148), a speed ratio of the CVT pulley belt 32 is controlled so that the rotation speed Vt of the input shaft 31 drops to the speed $I_0$ in a minimum energy loss state (Step 150).

While the speed of the CVT input shaft is controlled to drop to the speed $I_0$, the idling speed of the engine 12 that is started rotating by the procedure for starting engine (Step 152) is checked to find an idling speed $I_1$ (Step 160).

Subsequently, whether the idling speed $I_1$ found in Step 160 is substantially equal to $I_0$ within a certain allowable range is determined (Step 162). To be more concrete, whether Inequality (2) below is established is determined.

$$I_0 - m < I_1 < I_0 + m \quad (2)$$

where m is a given constant.

In a case where Inequality (2) above is established (affirmative determination in Step 162), the flow proceeds to the procedure for engaging clutch (Step 164). In a case where Inequality above is not established (negative determination in Step 162), the flow returns to a point B in the flowchart of FIG. 3 to repeat the process described above again from Step 100.

When the procedure for engaging clutch is performed, an output signal from the CVT input speed sensor 67 is checked again to find the rotation speed Vt of the CVT input shaft 31 (Step 166). Subsequently, it is determined whether a difference between the engine idling speed $I_1$ and the CVT input shaft speed Vt found in Step 166 falls within a certain range (Step 168). To be more concrete, whether Inequality (3) below is established is determined.

$$-n < I_1 - Vt < +n \quad (3)$$

where n is a given constant.

In a case where Inequality (3) above is established (affirmative determination in Step 168), because it is deemed that the idling speed $I_1$ is virtually equal to the CVT input shaft speed Vt, the clutch 16 is engaged without slip control (Step 170). On the contrary, in a case where Inequality (3) above is not established (negative determination in Step 168), because a slight difference between the idling speed $I_1$ and the CVT input shaft speed Vt is left, the clutch 16 is engaged while the slip control is performed, that is, slowly while the clutch pressure is raised by a predetermined time constant (Step 172). In either case, according to the first embodiment of the invention, the clutch 16 is engaged in a state where either the rotational frequency of the engine 12 substantially coincides with the rotational frequency of the CVT input shaft 31 realized by the CVT speed ratio control or a difference of these rotational frequencies is small. It thus becomes possible to minimize the influences to the life of the clutch by reducing slip of the clutch as well as to reduce a shock caused by the clutch engagement.

When the clutch 16 is engaged, torque of the engine 12 is outputted to the axle of the front wheels via the transmission 18 (Step 174). HEV-drive by the four-wheel drive is thus achieved. Thereafter, the flow returns to the point B in the flowchart of FIG. 3 to repeat the process described above again from Step 100.

Figure 8:
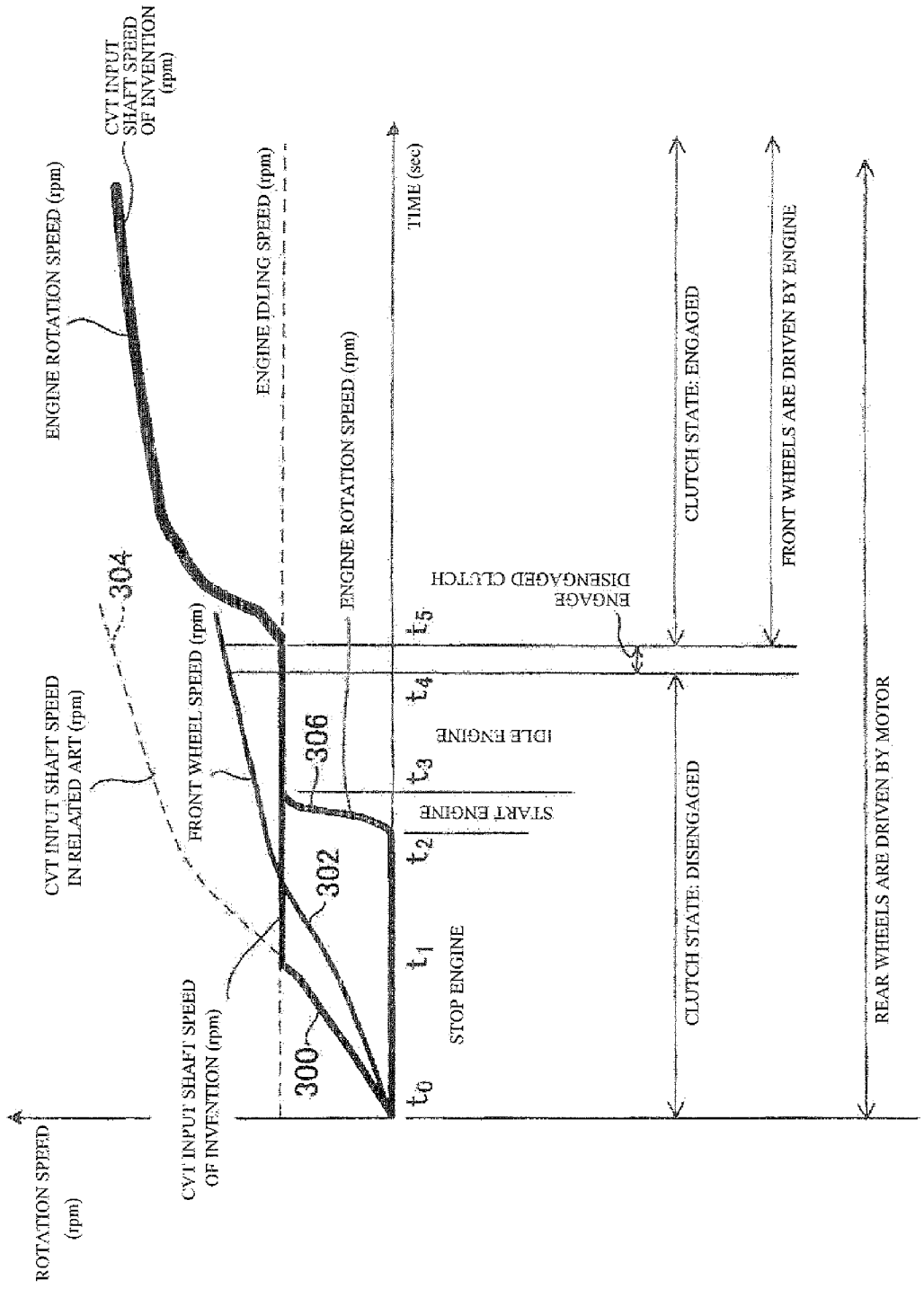
FIG. 8 is a schematic timing chart of the control method of the hybrid system according to the first embodiment of the invention.

The control until the hybrid drive mode is achieved described above using FIG. 3 and FIG. 4 will be briefly described using the timing chart of FIG. 8.

As is shown in FIG. 8, in the hybrid four-wheel-traction system, when the vehicle starts to move at a time $t_0$, E-drive is performed first ($t_0$ to $t_5$) by driving the rear wheel motor 26 in a period until the SOC of the battery, the vehicle speed, and the accelerator opening reach the corresponding preset values. In the initial period ($t_0$ to $t_2$), the front wheel traction system does not generate torque because the engine 12 is at rest and the clutch 15 remains disengaged ($t_0$ to $t_4$). Accordingly, as is indicated by a solid line 302, the front wheels are in a state of free running in association with the driving of the vehicle. In this state, the speed ratio of the CVT in the related art changes automatically with a speed change pattern in response to the vehicle speed and the accelerator opening as preset for a normal car. In a case where the vehicle speed climbs actually, so correspondingly does the rotation speed on the CVT input shaft side as is indicated by a broken line 304. In the invention, however, in such a state, the speed change control of the CVT is performed in a predetermined period ($t_1$ to $t_4$) in such a manner that the rotation speed of the CVT input shaft comes in close proximity to a preset constant value (for example, the engine idling rotational frequency). Because the front wheel traction system does not generate traction torque during this period, even when the CVT is controlled in a special manner as above, there will be no influences to the driving of the vehicle.

In this state, when the SOC of the battery, the vehicle speed, and the accelerator opening reach the corresponding preset values (time $t_2$), the engine is started by driving the motor (integrated starter generator) coupled to the engine shaft while the clutch is disengaged, so that, as is indicated by a solid line 306, the engine is kept rotating at a constant rotational speed over an engine idling period ($t_3$ to $t_5$). As are indicated by the solid lines 300 and 306, the engine rotational frequency coincides with the CVT input shaft rotational frequency realized earlier by the CVT speed ratio control. Hence, even the clutch is engaged instantaneously at a later time $t_4$, slip of the clutch will not occur. It thus becomes possible to minimize the influences to the life of the clutch as well as to reduce a shock caused by the clutch engagement. In addition, the control on the clutch can be simpler, which can in turn reduce the cost. When the traction force of the engine increases at a time $t_5$ and later, the front wheels are driven smoothly via the CVT.

Second Embodiment

A control method of a hybrid system according to a second embodiment of the invention will now be described. The second embodiment is applicable to the vehicle 10 shown in FIG. 1 and can be achieved by the control system shown in FIG. 2. Accordingly, the second embodiment will be described using the same components shown in FIG. 1 and FIG. 2. It should be noted that a capability newly added in the second embodiment can be achieved by the hybrid controller 50.

In the control method of the hybrid system of the second embodiment, the flow of the process until the E-drive is achieved is controlled according to the flowchart shown in FIG. 3. The flow after the drive mode shifts to the HEV-drive mode (Step 140) by the determination in Step 116 of FIG. 3 is different from the flow in the first embodiment and follows the flowchart shown in FIG. 5. Hereinafter, the second embodiment will be described using FIG. 5.

Figure 5:
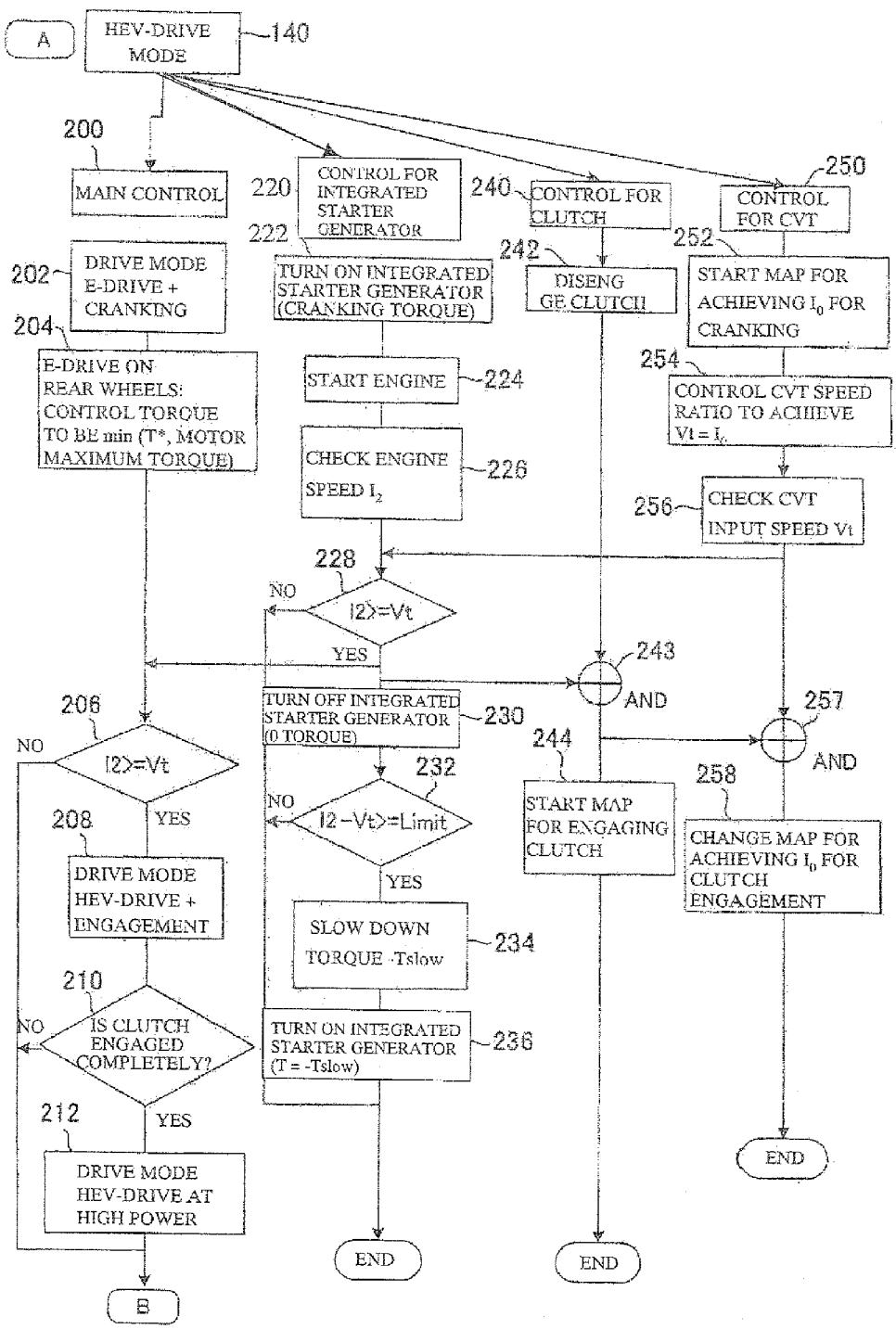
FIG. 5 is a flowchart showing the flow of the hybrid drive mode by a control method of a hybrid system according to a second embodiment of the invention.

As is shown in FIG. 5, after the drive mode shifts to the HEV-drive mode (Step 140), a main control program 200, a control program 220 for integrated starter generator that starts the engine by controlling the integrated starter generator 14, a control program 240 for clutch that performs a map for engaging the clutch 16, and a control program 250 for CVT that controls a speed ratio of the CVT pulley belt 32 are run in parallel.

By the main control 200, the E-drive mode for the rear wheels by the main motor 26 is continued (Step 202). In the E-drive mode for the rear wheels, torque of the main motor 26 is controlled to be either the demanded torque T* found in Step 106 or the maximum torque of the main motor 26, whichever is the smaller (Step 204). During this control, the engine 12 is started through the cranking of the integrated starter generator while the clutch 16 is disengaged and kept rotating by the control program 240 for clutch and the control program 220 for integrated starter generator described below. Meanwhile, the input shaft 31 of the CVT pulley belt 32 is in a state of free running in association with the forward movement of the vehicle.

Herein, it is determined whether an engine speed $I_2$ of the engine 12 is as high as or higher than the input shaft speed Vt of the CVT pulley belt 32 (Step 206). In the first embodiment above, the engine idling speed $I_1$ was subjected to comparison. The engine speed $I_2$ of the second embodiment is not limited to the idling speed and includes a higher speed. In a case where the engine speed $I_2$ is lower than the CVT input shaft speed Vt (negative determination in Step 206), the flow returns to Step 100 of FIG. 3 via the point B and the process is performed again from the start in the same manner as above. In a case where the engine speed $I_2$ becomes as high as or higher than the CVT input shaft speed Vt (affirmative determination in Step 206), the drive mode shifts to the HEV-drive (Step 208). In a case where the condition in Step 208 is satisfied, the map for engaging clutch in Step 244 by the control program 240 for clutch and the map for changing CVT input speed in Step 258 by the control 250 for CVT both described below have been already performed.

Herein, it is determined whether the clutch 16 is completely engaged (Step 210). In a case where the clutch 16 is completely engaged (affirmative determination in Step 210), torque of the engine 12 is outputted to the axle of the front wheels via the transmission 18. The HEV-drive by the four-wheel drive is thus achieved. Thereafter, the flow returns to the point B in the flowchart of FIG. 3 to repeat the process described above again from Step 100. In a case where the clutch 16 is not engaged completely (negative determination in Step 210), the flow returns to the point B in the flowchart of FIG. 3 to repeat the process described above again from Step 100.

By the control program 220 for integrated starter generator, the integrated starter generator 14 is turned on for operation to generate cranking torque (Step 222). The engine 12 is rotated by the cranking torque and the engine 12 is started by a supply and ignition of fuel (Step 224). In this instance, in order to obtain the maximum acceleration in the minimum time, it is preferable to fully open the throttle so that the engine torque is maintained at the maximum torque. When the engine is started, the speed of the engine 12 is checked to find the engine speed $I_2$ (Step 226).

Subsequently, it is determined whether the engine speed $I_2$ found in Step 226 is as high as or higher than the input shaft speed Vt of the CVT pulley belt 32 found in Step 256 by the control 250 for CVT described below (Step 228). In a case where the engine speed $I_2$ is lower than the CVT input shaft speed Vt (negative determination in Step 228), the control 220 for integrated starter generator is terminated. In a case where the engine speed $I_2$ becomes as high as or higher than the CVT input shaft speed Vt (affirmative determination in Step 228), the integrated starter generator 14 is turned off (Step 230). Torque given to the engine 12 from the integrated starter generator 14 in this instance is substantially 0.

Subsequently, it is determined whether a difference between the engine speed $I_2$ and the CVT input shaft speed Vt is equal to or larger than a threshold value Limit (Step 232). In a case where a difference between the engine speed $I_2$ and the CVT input shaft speed Vt is smaller than the threshold value Limit (negative determination in Step 232), it is deemed that there is substantially no difference between the engine speed $I_2$ and the CVT input shaft speed Vt and the control program 220 for integrated starter generator is terminated so as to perform the map for engaging clutch. In a case where a difference between the engine speed $I_2$ and the CVT input shaft speed Vt is equal to or larger than the threshold value Limit (affirmative determination in Step 232), it is determined that the engine rotational frequency is too high for clutch engagement. Accordingly, a negative slow down torque $T=-T_{slow}$, which is necessary to suppress a climbing speed of the engine rotational frequency, is calculated on the basis of a difference between the engine speed $I_2$ and the CVT input shaft speed Vt (Step 234). The negative slow down torque $-T_{slow}$ is calculated on the basis of full-throttle torque, the CVT input shaft speed (according to the map in Step 258 described below), inertia (on the engine side and the CVT side), and respective speed changes (on the engine side and the CVT input side, and the vehicle speed).

Subsequently, the integrated starter generator 14 is turned on for operation and controlled to generate the negative torque $T=-T_{slow}$ calculated in Step 234 (Step 236). The negative torque $T=-T_{slow}$ acts on the engine 12 so as to suppress a climbing speed of the engine rotational frequency. The engine speed thus climbs gradually. The speed of the CVT input shaft 31 in a state of free running climbs with a climb of the vehicle speed. However, because the climbing speed of the engine rotational frequency is suppressed, the speed of the CVT input shaft catches up with the engine rotational frequency at a given point in time. Thereafter, the control program 220 for integrated starter generator is terminated. It should be noted that the negative torque $-T_{slow}$ is generated by a regenerative operation by the integrated starter generator. An extra engine output in this instance is stored in the battery as electric energy.

By the control program 240 for clutch, the clutch 16 is controlled to be disengaged first (Step 242). Only in a case where both a condition of this clutch disengaged state and a condition that the engine speed $I_2$ becomes as high as or higher than the CVT input shaft speed Vt in Step 228 by the control program 220 for integrated starter generator are satisfied (AND 243 is true), the clutch 16 is engaged according to the predetermined map for engaging clutch (Step 244). Alternatively, a time at which the engine rotation speed reaches the target speed for starting clutch engagement may be predicted, so that the map for engaging clutch is changed by adjusting the timing of clutch engagement on the basis of the predicted time. Thereafter, the control program 240 for clutch is terminated.

By the control program 250 for CVT, the map for the CVT to reach the target speed $I_0$ for cranking is started (Step 252), and the CVT speed ratio is controlled so that the actual CVT input shaft speed Vt coincides with the target speed $I_0$ (Step 254). Under this control, the speed ratio of the CVT is changed to a low gear (the speed ratio is increased) so as to make a coincidence with the target speed for starting engine engagement. In this instance, the rotational frequency of the CVT input shaft 31 is decreased, and kinetic energy stored in the input shaft appears as an increase of torque at the CVT output shaft 33 via the CVT pulley belt 32. In should be noted that the main motor 26 can be used to correct a torque change (caused by a variance in momentum of the input shaft) when the speed ratio of the CVT is changed.

Subsequently, the speed of the CVT input shaft 31 is checked to find the rotation speed Vt of the CVT input shaft 31 (Step 256). The rotation speed Vt thus found is used also in Step 206 in the main control program 200 and in Step 228 in the control program 220 for integrated starter generator. In a case where both a condition that the rotation speed Vt is found and a condition that an AND operator 243 of the control program 240 for clutch is true are satisfied (AND operator 257 is true), the CVT speed ratio map to achieve the target speed $I_0$ is changed as needed for engaging clutch (Step 258). The map is changed by predicting a time at which the engine rotational frequency reaches the target speed for starting clutch engagement and by adjusting the temporal change pattern of the CVT speed ratio so as to achieve a CVT input speed with which clutch engagement is enabled at the predicted time. Thereafter, the control program 250 for CVT is terminated.

The control until the HEV-drive mode is achieved as described above using FIG. 5 will now be described briefly using the timing chart of FIG. 9.

Figure 9:
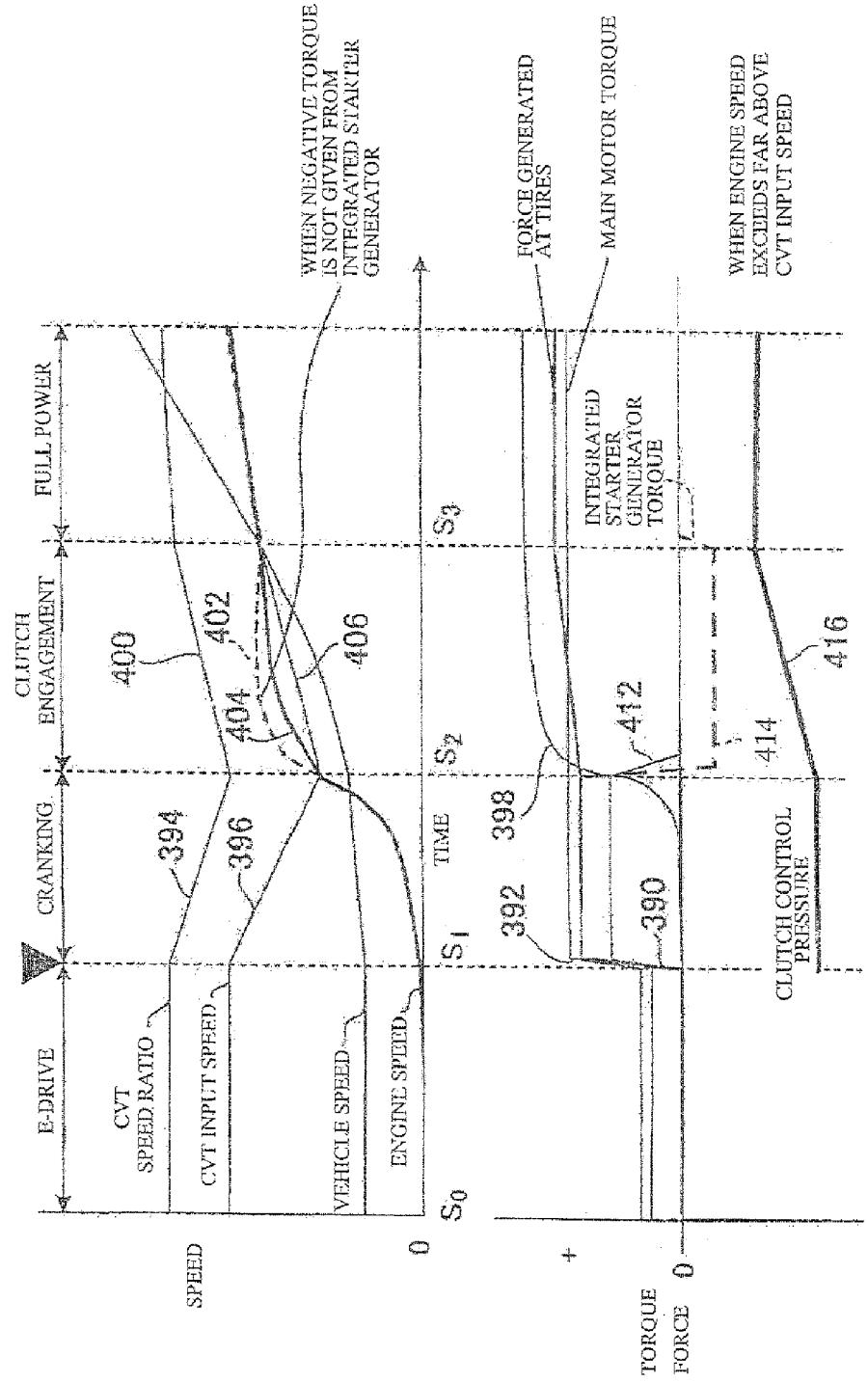
FIG. 9 is a schematic timing chart of the control method of the hybrid system according to the second embodiment of the invention.

FIG. 9 shows temporal changes of the CVT speed ratio, the CVT input speed, the vehicle speed, and the engine speed as well as temporal changes of main motor torque, integrated starter generator torque, engine torque, a force generated at tires, and a clutch control pressure.

The main motor 26 is started to be driven at constant torque at a time $S_0$ and a state in which the vehicle speed remains constant is maintained until a time $S_1$ (E-drive mode). During the E-drive mode, the CVT speed ratio is maintained constant and the CVT input speed therefore remains constant. The speed ratio of the CVT in this instance is adjusted so that a loss is minimized in a CVT idling state.

At the time $S_1$, torque of the main motor is increased to meet an acceleration demand from the driver. Also, torque of the integrated starter generator is increased because of torque for starting engine, and the cranking is started. At the latter half in the cranking mode, the engine is started and the rotational frequency increases abruptly by self-generated torque. As is indicated by a solid line 390, the integrated starter generator torque is increased abruptly. Thereafter, constant torque is maintained over a most of the period of the cranking mode. In association with this, torque of the main motor is increased as is indicated by a sold line 392 and maintained constant thereafter. Meanwhile, during the cranking mode, the CVT speed ratio is reduced as is indicated by a solid line 394. Accordingly, as is indicated by a solid line 396, the CVT input speed is decreased so as to achieve the target speed I0.

During the cranking mode, the engine 12 is started and it is controlled so that, as is indicated by a solid line 398, the engine torque is increased abruptly in the latter half of the cranking mode, in association with which the engine speed is climbing. More preferably, the engine is controlled at full-throttle torque. Accordingly, the engine speed reaches the CVT input speed at a time $S_2$ within a quite short time and exceeds the CVT input speed thereafter.

As is indicated by a solid line 416, the clutch control (for example, the clutch position) is performed from the time $S_2$ and the mode shifts to the clutch engaging mode (the clutch is disengaged in the cranking mode and at a preparing stage for engagement). In the clutch engaging mode, because a larger engine output (speed×torque) is secured when the mode shifts to the HEV mode by performing clutch engagement while increasing the engine speed, the CVT input speed is increased by changing the speed ratio of the CVT to become larger gradually (solid line 406). Meanwhile, because it is determined that the engine has been started, the integrated starter generator torque is reduced to 0 (solid line 412) to suppress a further climb of the engine speed. In this instance, in a case where a difference between the engine speed and the CVT input speed is too large (broken line 402 and solid line 406), a negative torque (broken line 414) is given from the integrated starter generator in order to suppress a climb of the engine speed, so that the engine speed is controlled to be the engine speed indicated by a solid line 404. This control can prevent a difference between the CVT input speed and the engine speed from being equal to or larger than the preset value.

At a time $S_3$, the engine speed and the CVT input speed almost coincide with each other and the clutch engagement is completed. Thereafter, the vehicle is driven by the REV-drive by the full-power four-wheel drive while the clutch control pressure is maintained constant. It thus becomes possible to achieve smooth transition from the steady drive by the motor to the REV-drive after the engine start.

The clutch engagement can be completed more rapidly by predicting that the engine speed and the CVT input speed almost coincide with each other at the time $S_3$ and by adjusting the clutch speed ratio map (solid line 400) and the clutch pressure map (solid line 416). Also, in a case where means capable of measuring torque applied on the clutch is provided, a climbing rate of the engine rotation can be predicted accurately on the basis of a difference between the clutch torque and the full-throttle engine torque. Torque of the integrated starter generator can be therefore adjusted more rapidly.

According to the second embodiment, the system does not wait passively until the engine speed and the CVT input speed almost coincide with each other but takes an action to approximate the engine speed to the target value by giving a load of the integrated starter generator to the engine rotating in close proximity to the maximum torque and to approximate the CVT speed ratio to the target value at the same time. It thus becomes possible to minimize an initial acceleration delay when the mode shifts from the motor drive to the hybrid drive. Further, even in such a transient state of the clutch engagement, it is possible to reduce clutch demanded heat quantity by minimizing an amount of clutch slip.

Figure 6:
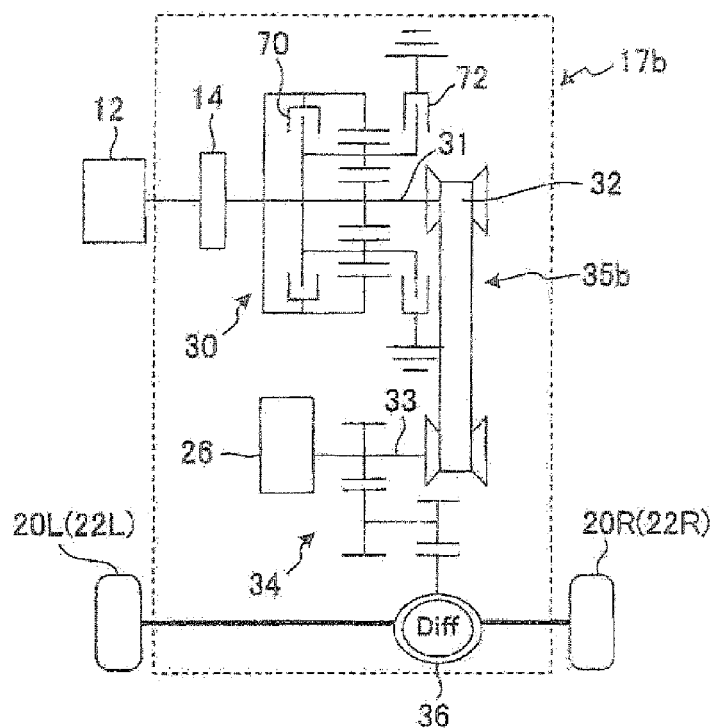
FIG. 6 is a schematic view of a vehicle according to an alternative example to which the control methods of the hybrid system according to the embodiments of the invention are applied.
Figure 7:
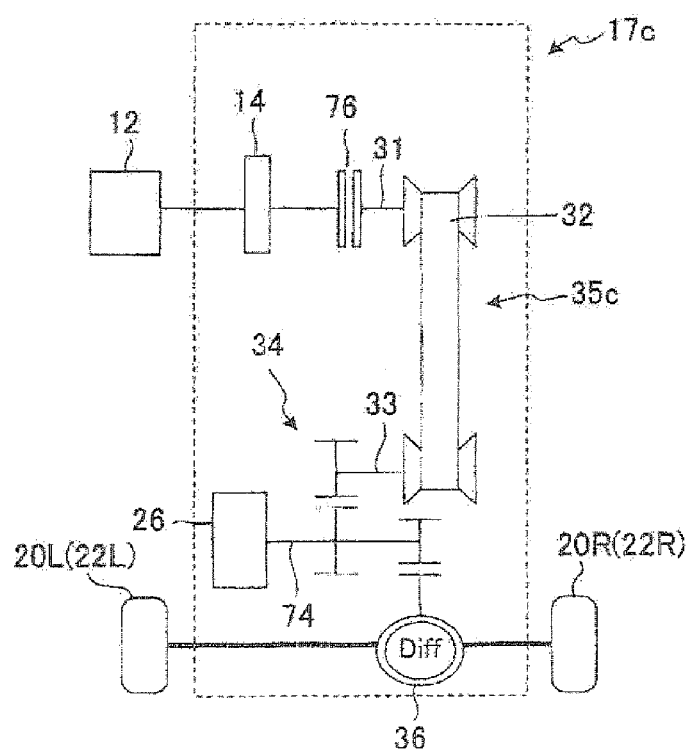
FIG. 7 is a schematic view of a vehicle according to another alternative example to which the control methods of the hybrid system according to the embodiments of the invention are applied.

In the first and second embodiments, as is shown in FIG. 1, the first traction system 17 driven by the engine is provided on the front wheel side and the second traction system 27 having the main motor 26 is provided on the rear wheel side. However, it is also possible to provide a traction system driven by both the internal-combustion engine and the main motor on the front engine side (or on the rear wheel side) whereas the rear wheel side (or the front wheel side) is left non-driven. Such alternative examples are shown in FIG. 6 and FIG. 7. In FIG. 6 and FIG. 7, like components are labeled with like reference numerals with respect to FIG. 1 and detailed descriptions are omitted herein.

According to the alternative example of FIG. 6, the main motor 26 is connected coaxially to the CVT output shaft 33 in a traction system 17b and the clutch 16 is omitted. A clutch operation for disengagement and engagement between the engine 12 and the CVT input shaft 31 can be replaced with an operation by a clutch 70 provided to the drive-reverse-neutral switching unit 30. In the example of FIG. 6, the drive-reverse-neutral switching unit 30 connected to the output side of the integrated starter generator 14, the CVT pulley belt 32, and the gear 34 together form a non-stage transmission 35b.

According to the alternative example of FIG. 7, the main motor 26 is connected to a counter shaft 74 of the CVT output shaft 33 in a traction system 17c. Also, the drive-reverse-neutral switching unit 30 is removed and an F/W damping factor integrated clutch 76 is disposed instead. In the example of FIG. 7, the CVT pulley belt 32 and the gear 34 together form a non-stage transmission 35c.

In the first and second embodiments, the CVT is in a state of free running in association with the front wheels in the E-drive mode. However, in the examples of FIG. 6 and FIG. 7, the CVT output shaft is rotated simultaneously by the main motor 26 in the E-drive mode, and the CVT input shaft is also rotated in response to the CVT speed ratio.

While the invention has been described by way of the respective embodiments above, the invention is not limited to the embodiments above and can be modified arbitrarily in a suitable manner within the scope of the invention defined by the appended claims. For example, in the configuration of FIG. 1, the first traction system 17 driven by the engine is provided on the front wheel side and the second traction system 27 having the main motor 26 is provided on the rear wheel side. However, the second traction system 27 having the main motor 26 may be provided on the front wheel side and the first traction system 17 driven by the engine may be provided on the rear wheel side. In addition, the configurations of FIG. 6 and FIG. 7 were described to provide the traction systems 17b and 17c on the front wheel side. They may be, however, provided on the rear wheel side.

The invention claimed is:

1. A control method for a hybrid vehicle in which the hybrid vehicle includes an internal-combustion engine, a traction motor that electrically drives the hybrid vehicle, a continuous variable transmission provided between an output shaft of the internal-combustion engine and an axle of first drive wheels, a clutch provided between the output shaft of the internal-combustion engine and an input shaft of the continuous variable transmission, and a starter motor connected coaxially to the output shaft of the internal combustion engine, the method comprising the steps of:

determining whether there is a need to add a traction force of the internal-combustion engine from a state where the vehicle is driven by the traction motor alone;

starting the internal-combustion engine using a torque of the starter motor in a state where the clutch is disengaged when it is determined that there is a need to add the traction force of the internal-combustion engine, subsequently increasing a torque of the internal-combustion engine, and controlling a speed ratio of the continuous variable transmission so that a rotation speed of the input shaft of the continuous variable transmission achieves a target speed for starting clutch engagement;

detecting a rotation speed of the output shaft of the internal-combustion engine;

detecting the rotation speed of the input shaft of the continuous variable transmission;

applying a negative torque of the starter motor to the internal-combustion engine to suppress a climb in the speed of the internal-combustion engine and switching the controlling the speed ratio of the continuous variable transmission from the achieving the target speed to increasing the rotation speed of the input shaft of the continuous variable transmission beyond the target speed, when the detected rotation speed of the output shaft of the internal-combustion engine becomes as high as or higher than the detected rotation speed of the input shaft of the continuous variable transmission; and operating the clutch to be engaged.

2. The control method for a hybrid vehicle according to claim 1, wherein the load of the starter motor is adjusted according to a difference between the rotation speed of the output shaft of the internal-combustion engine and the rotation speed of the input shaft of the continuous variable transmission.

3. The control method for a hybrid vehicle according to claim 2, wherein the load of the starter motor is adjusted by controlling the starter motor to generate zero torque or negative torque.

4. The control method for a hybrid vehicle according to claim 1, wherein the traction motor is coupled to an axle of second drive wheels that is different from the axle of the first drive wheels.

5. The control method for a hybrid vehicle according to claim 4, wherein the hybrid vehicle is a four-wheel drive vehicle having the first drive wheels and the second drive wheels.

6. The control method for a hybrid vehicle according to claim 1, wherein the step of increasing the torque of the internal-combustion engine drives the internal-combustion engine at the maximum power.

7. The control method for a hybrid vehicle according to claim 1, wherein the target speed for starting clutch engagement is set to an idling speed of the internal-combustion engine.

8. The control method for a hybrid vehicle according to claim 1, wherein the determining step determines that there is a need to add a traction force of the internal-combustion engine when demanded torque from the driver exceeds torque achievable by the traction motor.

9. The control method for a hybrid vehicle according to claim 1, further comprising the step of controlling the speed ratio of the continuous variable transmissions so that the rotation speed of the input shaft of the continuous variable transmission reaches the target speed for starting clutch engagement even when it is determined that there is no need to add the traction force of the internal-combustion engine in the determining step.

10. The control method for a hybrid vehicle according to claim 1, wherein the hybrid vehicle further includes:

a drive-reverse-neutral switching unit provided on an internal-combustion engine output side of the continuous variable transmission; and a gear provided on the axle side of the first drive wheels of the continuous variable transmission, wherein the clutch is achieved by a clutch provided at least inside the drive-reverse-neutral switching unit, and wherein the traction motor is coupled coaxially to the output shaft of the continuous variable transmission.

11. The control method for a hybrid vehicle according to claim 1, wherein the hybrid vehicle further includes a gear provided between the output shaft of the continuous variable transmission and the axle of the first drive wheels and equipped with a counter shaft of the output shaft of the continuous variable transmission, and wherein the traction motor is coupled coaxially to the counter shaft.

* * * * *